United States Patent
Yamashita

[11] Patent Number: 6,054,944
[45] Date of Patent: Apr. 25, 2000

[54] DATA TRANSMISSION METHOD AND DEVICE USING 8-10 BIT CONVERSION AND SUCCESSIVE PLUS AND MINUS RUNNING DISPARITY SYNCHRONOUS DATA WORDS

[75] Inventor: Shigeyuki Yamashita, Kanagawa, Japan

[73] Assignee: Sony Corporation, Tokyo, Japan

[21] Appl. No.: 09/120,852

[22] Filed: Jul. 22, 1998

Related U.S. Application Data

[63] Continuation of application No. PCT/JP97/04263, Nov. 21, 1997.

[30] Foreign Application Priority Data

Nov. 22, 1996 [JP] Japan ................................. 8-312276

[51] Int. Cl.[7] .............................. H03M 5/00; H03M 7/00
[52] U.S. Cl. ................................. 341/95; 341/59; 341/58; 375/292
[58] Field of Search ........................... 341/55, 58, 95, 341/59; 375/292, 285

[56] References Cited

U.S. PATENT DOCUMENTS

| | | | |
|---|---|---|---|
| 4,348,659 | 9/1982 | Fujimori et al. | 341/58 |
| 4,486,739 | 12/1984 | Franaszek et al. | 341/59 |
| 4,517,552 | 5/1985 | Shirota et al. | 341/58 |
| 5,557,594 | 9/1996 | Chiba et al. | 369/59 |
| 5,786,777 | 7/1998 | Hirai | 341/55 |

FOREIGN PATENT DOCUMENTS

| | | | |
|---|---|---|---|
| 63-160422 | 7/1988 | Japan | H03M 7/14 |
| 7-230672 | 8/1995 | Japan | G11B 20/14 |

*Primary Examiner*—Brian Young
*Assistant Examiner*—Patrick Wamsley
*Attorney, Agent, or Firm*—Limbach & Limbach L.L.P.

[57] ABSTRACT

In the case of transmitting upon converting the 8-bit word string data showing signal information to the 10-bit word string data consisting of word synchronous data, 8-bit word string data showing signal information is obtained and after inserting 2 each of the 8-bit word synchronous data and the 8-bit auxiliary word data to be converted to the 10-bit neutral word data, 8 to 10 bits conversion is conducted to the 10-bit word string data and transmitted; when converting the 8-bit word synchronous data to 10-bit word synchronous data, if the immediately preceding word data is the data having plus running disparity, it is converted to 10-bit word synchronous data having minus running disparity, and if the immediately preceding word data is the data having minus running disparity, it is converted to the 10-bit word synchronous data having plus running disparity. Thereby, in the case of reproducing the signal information at the receiving end, the necessary signal synchronization can be certainly obtained.

12 Claims, 6 Drawing Sheets

| | | CRD | - | + |
|---|---|---|---|---|
| DN(8) | 000 00001 | DN(10) | 011101 0100 | 100010 1011 |

FIG. 6

| | | (+DS(10)) | (DN(10)) | (-DS(10)) | (DN(10)) | |
|---|---|---|---|---|---|---|
| (A) | DVB'<br>($A_{10}$~$A_{19}$) | 001111 1010 | 100010 1011<br>(011101 0100) | 110000 0101 | 011101 0100<br>(100010 1011) | DVA'<br>($D_0$~$D_9$) |
| RD: | - | + | (±) | - | (±) | |

| | | (-DS(10)) | (DN(10)) | (+DS(10)) | (DN(10)) | |
|---|---|---|---|---|---|---|
| (B) | DVB'<br>($A_{10}$~$A_{19}$) | 110000 0101 | 011101 0100<br>(100010 1011) | 001111 1010 | 100010 1011<br>(011101 0100) | DVA'<br>($D_0$~$D_9$) |
| RD: | + | - | (±) | + | (±) | |

| CRD | − | + |
|---|---|---|
| DS(10) | 001111 1010 | 110000 0101 |

DATA TRANSMISSION METHOD AND DEVICE USING 8-10 BIT CONVERSION AND SUCCESSIVE PLUS AND MINUS RUNNING DISPARITY SYNCHRONOUS DATA WORDS

"This application is a continuation of International application number PCT/JP97/04263, filed Nov. 21, 1997 (status, abandoned, pending, etc.)."

TECHNICAL FIELD

The present invention relates to a data transmission method and device for converting 8 bits word string data representing signal information such as image signal information to 10 bits word string data containing word synchronous data and transmitting to a transmission path.

BACKGROUND ART

As a transmission mode of digital data showing various signal information, an optical transmission system which converts digital data to an optical signal and transmits via transmission path formed by using optical fiber has been proposed. The digital data to be processed under such optical transmission system is serial data having the bit rate of approximately from several hundreds (Mbps) to one (Gbps).

The digital data to be processed under the optical transmission system is converted from 8-bit word string data in which 1 word is formed with 8 bits into 10 bits word string data in which 1 word is formed with 10 bits, that is 8–10 bit conversion is conducted at the transmitting end and transmitted as 10-bit word string data. Then, at the receiving end, 10–8 bit word string data conversion that converts the 10-bit word string data received to the former 8-bit word string data is conducted.

Every word having 10 bits in the 10-bit word string data used in the transmission system is categorized in terms of the number of ones and zeros; i.e., the number of ones is larger than the number of zeros, the number of zeros is larger than the number of ones, and the equal numbers of ones and zeros are present. In this connection, in order to indicate the condition of the number of ones and zeros, the idea of running disparity (RD) is adopted; it is called that when the number of ones is larger than the number of zeros, the running disparity (RD) is plus, and when the number of zeros is larger than the number of ones, the RD is minus, and moreover, when the number of ones and the number of zeros are the same, the RD is neutral. And the word data having more ones than zeros is called as the word data having plus RD (plus word data), the word data having more zeros than ones is called as the word data having minus RD (minus word data), and the word data having the equal number of ones and zeros is called as the word data having neutral RD (neutral word data).

Furthermore, in the case of transmitting 10-bit word string data, considering the word synchronization that divides serial data per 10-bit word correctly at the receiving end, word synchronous data will be inserted as required. This word synchronous data is the word consisting of 10 bits but this word is the word having special code that can not be used as the 10-bit word to conduct the information transmission. In the case where the word synchronous data is being assigned, if the immediately preceding word data is the data having minus RD, it is considered that the word synchronous data has plus RD, and if the immediately preceding word data has plus RD, it is considered that the word synchronous data has minus RD.

Figure 10:
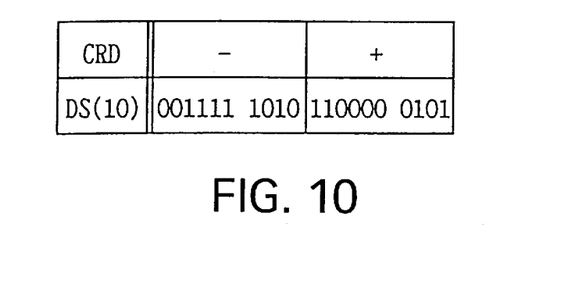
FIG. 10 is a schematic diagram illustrating the word synchronous data to be used in the digital data transmission.

FIG. 10 shows an example of 10-bit word synchronous data DS (10), and when the immediately preceding word data has minus (−) RD, i.e., CRD (current running disparity), the word synchronous data DS (10) is considered as "001111 1010" having plus RD, and when the immediately preceding word data has plus (+) CRD, the word synchronous data DS (10) is considered as "110000 0101" having minus RD (hereinafter "001111 1010" is referred to as the word synchronous data +DS (10), and "110000 0101" is referred to as the word synchronous data −DS (10)).

These examples of word synchronous data "001111 1010" and "110000 0101" are defined as the code name K28.5 based on the fiber channel standard ANSI X3.230-1994.

When the 10-bit word string data to be transmitted under the above condition is regarded as the data showing image signal information, it is considered that 10-bit word can be correctly divided using the word synchronous data at each horizontal interval at the receiving end by inserting word synchronous data at each horizontal interval of the image signal.

In this case, either the word synchronous data +DS (10) having plus RD or the word synchronous data −DS (10) having minus RD will be inserted at each horizontal interval of image signal depending upon whether the RD of the immediately preceding word data is minus or plus at the transmitting end.

For example, in the case of inserting the word synchronous data at the transmitting end, if the RD of the immediately preceding word data is minus, plus word synchronous data +DS (10) is inserted, and when the RD of the immediately preceding word data is plus, minus word synchronous data −DS (10) is inserted.

The image signal information in which word synchronous data is inserted is converted from 20-bit parallel data to serial data and transmitted from the transmitting end to the receiving end, and word synchronous data is extracted from the 10-bit word string data at the receiving end, and thus dividing the serial transmission data per 10-bit word, it is considered that the serial data can be correctly divided per 10-bit word at each horizontal interval in which said word synchronous data is inserted.

In the case of detecting the word synchronous data, the receiving end that sequentially receives 10-bit word string data of the image signal information (serial data) to which the word synchronous data +DS (10) or −DS (10) has been assigned at each horizontal interval of the image signal information at the transmitting end, only detects plus word synchronous data +DS (10) but does not detect minus word synchronous data −DS (10).

However, if the word synchronous data detection at the receiving end only detects the word synchronous data +DS (10) and not detect the word synchronous data −DS (10), there causes an inconvenience in conducting the data processing at the receiving end, since either the word synchronous data having plus RD +DS (10) or having minus RD −DS (10) is inserted depending upon the RD condition of the immediately preceding word data, i.e., the RD of the immediately preceding data is minus or plus, at each part corresponding to the horizontal synchronization in image signal.

More specifically, since the receiving end only detects the word synchronous data +DS (10) and does not detect the word synchronous data −DS (10) when conducting the processing of 10-bit word string data, the condition in which word synchronous data detection can be conducted at the part corresponding to the horizontal interval in the image signal information can not be secured, and as a result, when reproducing the image signal information represented by 10-bit word string data, it caused a problem that the correct word synchronization at each horizontal interval could not be obtained.

DISCLOSURE OF THE INVENTION

The present invention has been done considering the above points and is proposing a data transmission method and data transmission device capable of obtaining the condition by which required signal synchronous condition can be certainly secured when reproducing the signal information represented by 10-bit word string data at the receiving end, when transmitting the 10-bit word string data after converting the 8-bit word string data representing signal information such as image signal information to the 10-bit word string data consisting of both the word synchronous data having plus RD and the word synchronous data having the minus RD even if the word synchronous data detection at the receiving end detects only word synchronous data having plus RD.

The transmission method according to the present invention, after obtaining 8-bit word string data representing the signal information, 2 each of the 8-bit word synchronous data having preset code and the 8-bit auxiliary word data to be converted to the 10-bit neutral word data will be inserted between words in the 8-bit word string data corresponding to the predetermined timing signal; and the 8-bit word string data in which the 8-bit word synchronous data and the 8-bit word string data in which 8-bit auxiliary word data are inserted will be converted to 10-bit word string data, and composite 10-bit word synchronous data having the part to which two 10-bit word synchronous data and 10-bit neutral word data are allocated alternately and this composite 10-bit word string data will be transmitted so that when converting the 8-bit word string data to the 10-bit word string data, the 8-bit word synchronous data will be converted to the 10-bit word synchronous data having minus RD if the immediately preceding word data has the plus RD; and if the immediately preceding word data has the minus RD, converted to the 10-bit word synchronous data having the plus RD.

Furthermore, the transmission device according to the present invention comprises a digital data forming unit for obtaining 8-bit word string data showing signal information, a word synchronous data generation unit for outputting 8-bit word synchronous data having preset code, an auxiliary word data generating unit for outputting the 8-bit auxiliary word data to be converted to the 10-bit neutral word data, a data adder unit for allocating two 8-bit word synchronous data and 8-bit auxiliary word data between words in the 8-bit word string data obtained from the digital data forming unit according to the predetermined timing signal; a 10-bit word string data forming unit which converts the 8-bit word synchronous data obtained from the data adder unit and the 8-bit word string data in which 8-bit auxiliary word data is inserted to 10-bit word string data and simultaneously obtains the composite 10-bit word string data having the part to which two 10-bit word synchronous data based on the 8-bit word synchronous data and the 10-bit neutral word data based on the 8-bit auxiliary word data are allocated alternately in succession; and a data transmission unit for outputting the composite 10-bit word string data; and in the case where the 10-bit word string data forming unit converts the 8-bit word string data to the 10-bit word string data, the 8-bit word synchronous data is converted to the 10-bit word synchronous data having the minus RD when the immediately preceding word data has the plus RD, and when the immediately preceding word data has the minus RD, the 8-bit word synchronous data is converted to the 10-bit word synchronous data having the plus RD.

DESCRIPTION OF THE PREFERRED EMBODIMENTS

Figure 1:
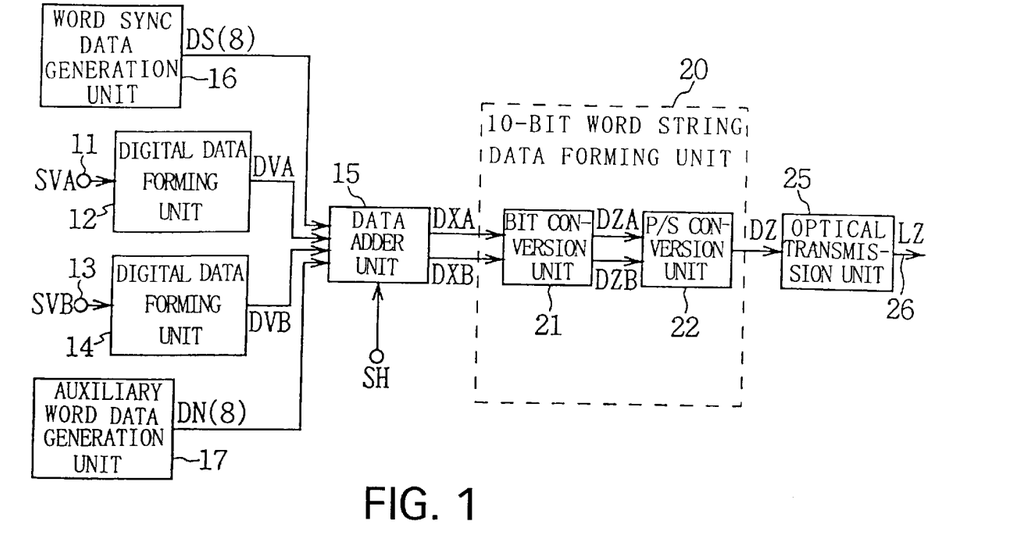
FIG. 1 is a block diagram showing an example of the data transmission device and its method according to the present invention.

FIG. 1 shows an example of data transmission device and its method according to the present invention.

In the example shown in FIG. 1, image signal SVA of the first channel is supplied to a digital data forming unit 12 via an image signal terminal 11 and image signal SVB of the second channel is supplied to a data forming unit 14 via an image signal terminal 13. In general, the content of image information that the image signal SVA shows is different from those of the image signal SVB shows.

In the digital data forming unit 12, an analog/digital conversion is conducted on the image signal SVA and 8-bit word string data DVA showing image signal information based on the image signal SVA is formed. This 8-bit word string data DVA forms digital data of the image signal SVA by arranging 8-bit word data SVA.

Similarly, in the digital data forming unit 14, analog/digital conversion is conducted on the image signal SVB and 8-bit word string data DVB showing image signal information based on the image signal SVB is formed. This 8-bit word string data DVB forms digital data of the image signal SVB by arranging 8-bit word data.

Then, the 8-bit word string data DVA obtained from the digital data forming unit 12 and the 8-bit word string data obtained from the digital data forming unit 14 will be supplied to a data adder unit 15. The 8-bit word string data DVA and the 8-bit word string data DVB are in synchronism with each other.

Furthermore, in the example shown in FIG. 1, a word data generating unit 16 for transmitting 8-bit word synchronous data DS (8) and an auxiliary word data generating unit 17 to transmit 8-bit auxiliary word data DN (8) are provided. And the word synchronous data DS (8) from the word synchronous data generating unit 16 and the auxiliary word data DN(8) from the auxiliary word data generating unit 17 are supplied to the data adder unit 15.

At the time when the 8-bit word synchronous data DS (8) is given the 8 to 10 bits conversion for example, it has a specific code that makes the DS (8) to be converted either to the word synchronous data +DS (10) which is the 10-bit word synchronous data DS (10) having plus RD, i.e., "001111 1010", or the word synchronous data −DS (10) which is the 10-bit word synchronous data DS (10) having minus RD, i.e., "110000 0101". The code of 8-bit word synchronous data DS (8) cannot be used as the code for the word data forming 8-bit word string data DVA and DVB.

On the other hand, the 8-bit auxiliary word data DN (8), for example, when it is being given the 8–10 bits conversion, it is converted to the neutral word data DN (10) formed with 10 bits that is defined by the fiber channel standard and selected to "1000 00001", for example.

In the data adder unit 15, timing signal SH that corresponds to the horizontal synchronizing signal in the image signal SVA or image signal SVB and synchronizes to the part corresponding to horizontal interval (horizontal interval part) in the 8-bit word string data DVA and the 8-bit word string data DVB showing the image signal information will be also supplied.

Figure 2:
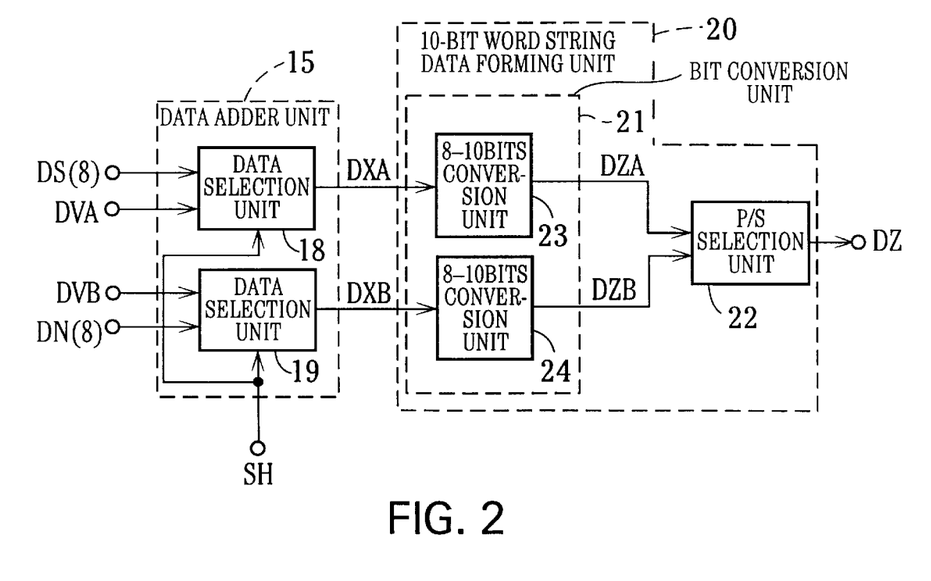
FIG. 2 is a block diagram showing the detailed construction of the part including a data adder unit and 10-bit word string data forming unit shown in the example of FIG. 1.

The data adder unit 15 is comprised of data selection units 18 and 19 as shown in FIG. 2, for example. In the data selection unit 18, 8-bit word string data DVA from the digital data forming unit 12, 8-bit word synchronous data DS (8) from the word synchronous data generation unit 16, and the timing signal SH will be supplied; and the 8-bit word string data DVB from the digital data forming unit 14, the 8-bit auxiliary word data DN (8) from the auxiliary word data generation unit 17, and the timing signal SH will be supplied to the data selection unit 19.

Figure 3:
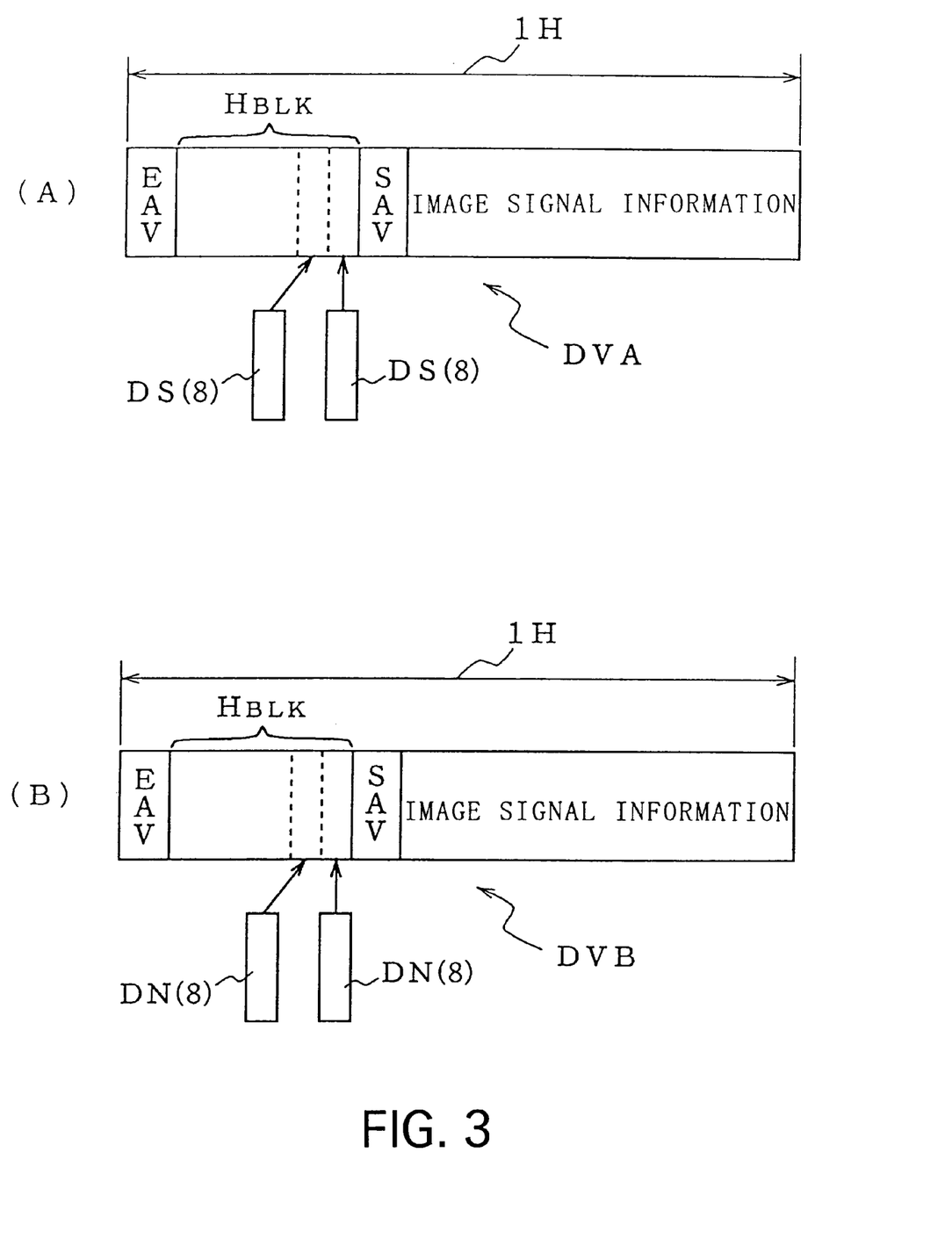
FIG. 3 is a diagrammatic sketch showing an image signal information for one horizontal interval and horizontal blanking interval.

Then, in the data selection unit 18, as shown in FIG. 3 (A), inactive data for 2 words allocated to the vacant area of the horizontal blanking area $H_{BLK}$ (area in which no effective data is allocated) in the 8-bit word string data DVA showing the image signal information is replaced by 2 word synchronous data DS (8). In this case, if RD of the immediately preceding word data of said replacing area is minus, the word synchronous data to be placed in said area becomes +DS (8) based on the fiber channel standard, and in the case where RD of the immediately preceding word data is plus, the word synchronous data to be replaced in said area becomes −DS (8) based on the fiber channel standard.

Figure 4:
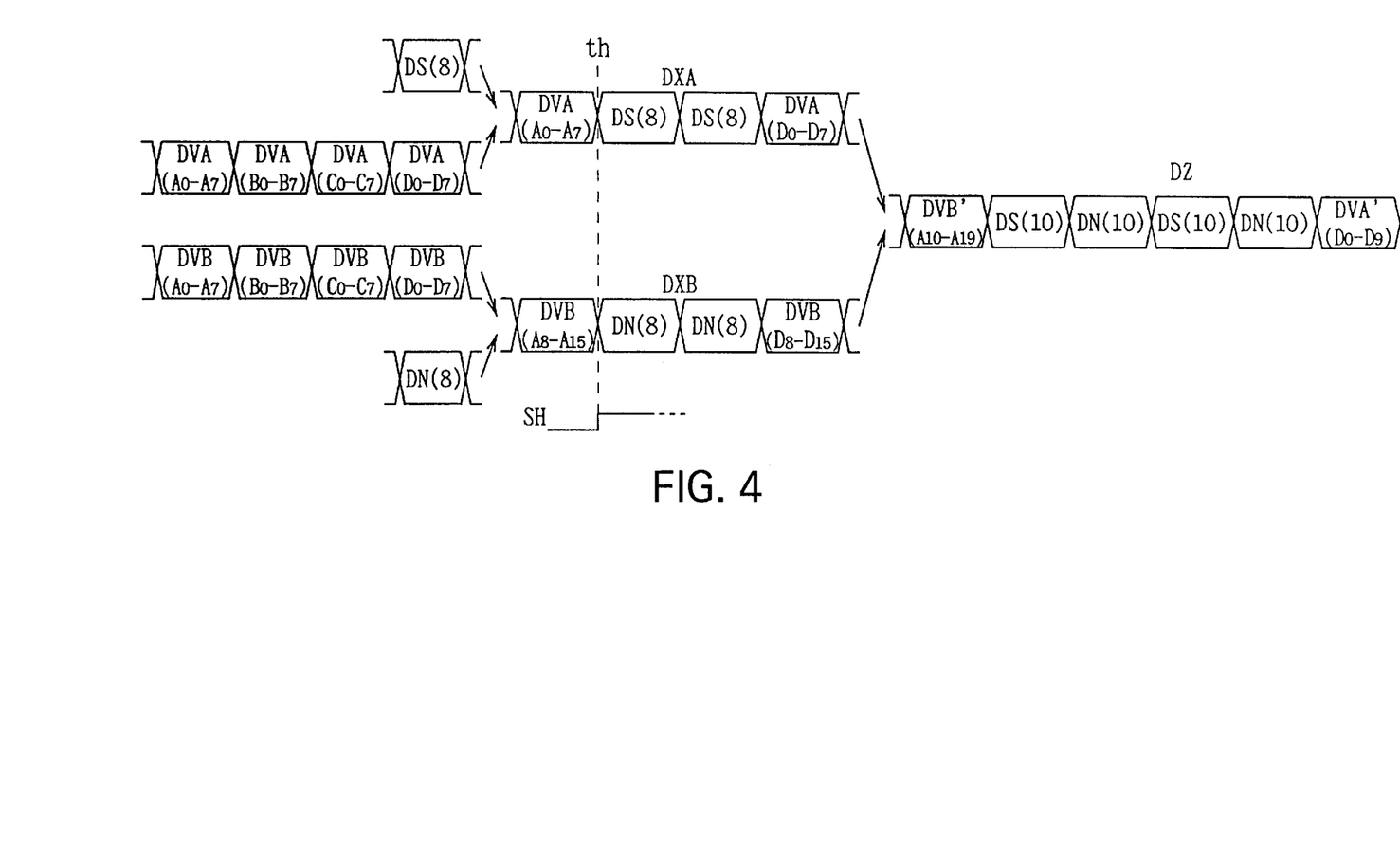
FIG. 4 is a data block diagram illustrating the operation of the example shown in FIG. 1.

With this arrangement, as shown in FIG. 4, in the data selection unit 18, of word data $(A_0–A_7)–(D_0–D_7)$ forming the horizontal interval part in the 8-bit word string data DVA, word data $(B_0–B_7)$ and $(C_0–C_7)$ which are inactive data in the horizontal blanking interval will be replaced by the word synchronous data DS (8), and two word synchronous data DS (8) will be consecutively allocated between the word data $(A_0–A_7)$ and word data $(D_0–D_7)$ in the horizontal interval part of the 8-bit word string data DVA. More specifically, two word sync data DS (8) are allocated consecutively between words of the horizontal interval part in the 8-bit word string data DVA, and thus, as shown in FIG. 4, 8-bit word string data DXA added such as by inserting 2 word synchronous data DS (8) consecutively per the time point th of the front edge part of the timing signal SH will be formed.

Furthermore, in the data selection unit 19, as shown in FIG. 3 (B), at each horizontal interval of the 8-bit word string data DVB showing the image signal information, 2 words of inactive data allocated to the vacant area of the horizontal blanking area $H_{BLK}$ (area in which no effective data is allocated) will be replaced by 2 auxiliary word data DN (8).

Thus, as shown in FIG. 4, in the data selection unit 19, of word data $(A_8–A_{15})–(D_8–D_{15})$ forming the horizontal interval part in the 8-bit word string data DVB, each inactive word data $(B_8–B_{15})$ and $(C_8–C_{15})$ of the horizontal blanking interval is replaced by the auxiliary word data DN (8) and two auxiliary word data DN (8) will be allocated consecutively between the word data $(A_8–A_{15})$ and the word data $(D_8–D_{15})$ in the horizontal interval part of the 8-bit word string data DVB. More precisely, two auxiliary word data DN (8) are allocated consecutively between words of the horizontal interval part in the 8-bit word string data DVB, and as a result, as shown in FIG. 4, inserting two auxiliary word data DN (8) in succession per the time point th of the front edge part of the timing signal SH, 8-bit word string data DXB will be formed.

8-bit word string data DXA and DXB to be obtained from the data adder unit 15 comprising the data selection units 18 and 19 will be supplied to the 10-bit word string data forming unit 20 (FIG. 2). The 10-bit word string data forming unit 20 is comprised of a bit conversion unit 21 to which the 8-bit word string data DXA and DXB are supplied as input data and a parallel/serial (P/S) conversion unit 22 to which the output data to be obtained from the bit conversion unit 21 is supplied.

The bit conversion unit 21 is comprise of 8–10 bit conversion units 23 and 24 as shown in FIG. 2. In the 8–10 bit conversion unit 23, the 8-bit word string data DXA in which 2 word synchronous data DS (8) are allocated to the part corresponding to the horizontal blanking interval in each horizontal interval part to be obtained from the data selection unit 18 in the data adder unit 15 will be supplied, and the 8-bit word string data DXB in which 2 auxiliary word data DN (8) are allocated to the part corresponding to the horizontal blanking interval in each horizontal interval part to be obtained from the data selection unit 19 in the data adder unit 15 will be supplied into the 8–10bit conversion unit 24.

Then, in the 8–10 bit conversion unit 23, 8–10 bit conversion is given to the 8-bit word string data DXA and the 8-bit word string data DXA is converted to 10-bit word string data DZA. In this case, regarding each of two word synchronous data DS (8) allocated to the part corresponding to the horizontal blanking interval in each horizontal interval part in the 8-bit word string data DXA, firstly, if the RD of the immediately preceding word data of the first word synchronous data DS (8) is minus, it is converted to the word synchronous data +DS (10) that is the word synchronous data DS (10) formed with 10 bits having plus RD, i.e., bit converted to "001111 1010". Moreover, when the RD of the immediately preceding word data is plus, it is converted word synchronous data −DS (10) that is the word synchronous data DS (10) formed with 10 bits having minus RD, i.e., bit converted to "110000 0101". And when the first one is bit converted to the word synchronous data +DS (10) having plus RD, i.e., "001111 1010", the following second one will be bit converted to the word synchronous data −DS (10) that is the word synchronous data DS (10) formed with 10 bits having minus RD, i.e., "110000 0101". And when the first one is bit converted to the word synchronous data −DS (10) having minus RD, i.e., "110000 0101", the second one is bit converted to the word synchronous data +DS (10) that is the 10-bit word data DS (10) having plus RD, i.e., "001111 1010".

Figure 5:
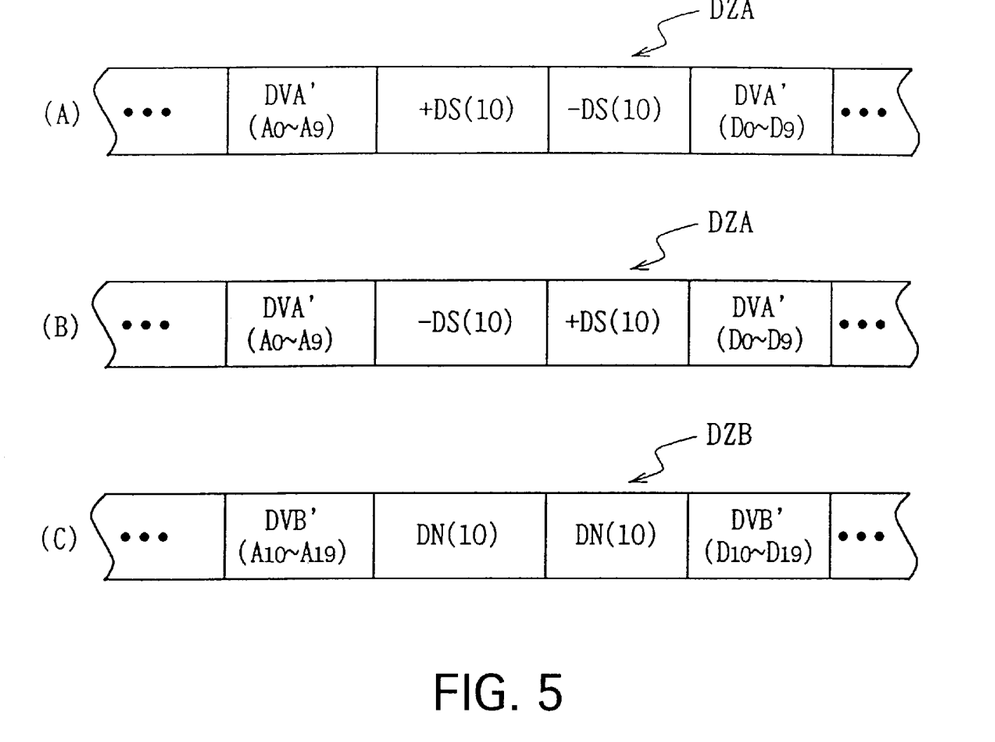
FIG. 5 is a data block diagram illustrating the operation of the example shown in FIG. 1.

Accordingly, in the 10-bit word string data DZA that is formed in the 8–10 bit conversion unit 23, as shown in FIG. 5 (A), the 10-bit word synchronous data +DS (10) having plus RD, i.e., "001111 1010", and following this the 10-bit word synchronous data −DS (10) having minus RD, i.e., "110000 0101" are allocated to the part corresponding to the horizontal blanking interval in its each horizontal interval part, or contrary to this, as shown in FIG. 5 (B) the condition in which the word synchronous data −DS (10), i.e., "110000 0101" is followed by the word synchronous data +DS(10), i.e., "001111 1010" is allocated.

Here, the condition in which +DS (10) shown in FIG. 5 (A) is firstly allocated or the condition in which −DS (10) shown in FIG. 5 (B) is allocated first will be determined depending on the polarity of RD (minus or plus) of the immediately preceding word data of the word synchronous data.

Figure 6:
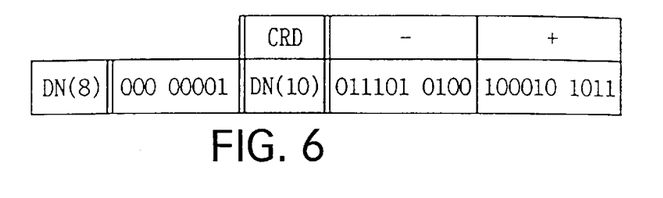
FIG. 6 is a schematic diagram illustrating the operation of the bit conversion unit in the example shown in FIG. 1.

Furthermore, in the 8–10 bit conversion unit 24, the 8–10 bit conversion is applied to the 8-bit word string data DXB and the 8-bit word string data DXB is converted to 10-bit word string data DZB. In this case, regarding each of 2 auxiliary word data DN (8) inserted to the part corresponding to the horizontal blanking interval in each horizontal interval part in the 8-bit word string data DXB, i.e., "000 00001", as shown in FIG. 6, when CRD of the immediately preceding word data is minus, the first one is bit converted to "011101 0100" that is the neutral word data formed with 10 bits DN (10) (hereinafter referred to as 10-bit neutral auxiliary word data). And when CRD of the immediately preceding word data is plus, it is bit converted to "100010 1011" that is the other neutral auxiliary word data DN (10) formed with 10 bits. Then, when the first one is bit converted to "011101 0100", the second one will be bit converted to "100010. 1011" that is 10-bit neutral auxiliary word data DN (10), or when the first one is bit converted to "100010 1011" that is the 10-bit neutral auxiliary word data DN (10), the second one will be bit converted to "011101 0100" that is the 10-bit neutral auxiliary word data DN (10).

Accordingly, regarding the 10-bit word string data DZB formed in the 8–10 bit conversion unit 24, in the part corresponding to the horizontal blanking interval in its each horizontal interval part, the condition in which 10-bit neutral auxiliary word data DN (10) "100010 1011" is followed by the 10-bit neutral auxiliary word data DN (10) "011101 0100", or contrary to this, the 10-bit neutral auxiliary word data DN (10) "011101 0100" is followed by the 10-bit neutral auxiliary word data DN (10) "100010 1011" is allocated. In this case, if both the neutral auxiliary word data "011101 0100" and "100010 1011" are shown as DN (10), as shown in FIG. 5 (C), this is the condition in which two neutral auxiliary word data DN (10) are consecutively exist.

10-bit word string data DZA and DZB obtained respectively from the 8–10 bit conversion units 23 and 24 in the bit conversion unit 21 will be supplied to the P/S conversion unit 22. In the P/S conversion unit 22, the P/S conversion that converts 20 bits parallel data formed by adding up 10-bit word string data DZA and 10-bit word string data DZB to serial data is conducted and the composite 10 bits word string data DZ (serial data) will be formed.

In this case, the 10-bit word synchronous data having plus RD +DS (10), i.e., "001111 1010" and the 10-bit word synchronous data having minus RD −DS (10), i.e., "110000 0101", which are allocated to the part corresponding to the horizontal blanking interval in each horizontal interval part of the 10-bit word string data DZA, and the 10-bit neutral auxiliary word data DN (10), "100010 1011" and the 10-bit neutral auxiliary word data DN (10) "011101 0100" which are allocated to the parts corresponding to the horizontal blanking interval in each horizontal interval part of the 10-bit word string data DZB will be processed that, as shown in FIG. 4, the composite 10-bit word string data DZ (serial data), is to be allocated to the part corresponding to the horizontal blanking interval in each horizontal interval part in order that two 10-bit word synchronous data DS (10) and 10-bit neutral auxiliary word data DN (10) range alternately in succession.

Figure 7:
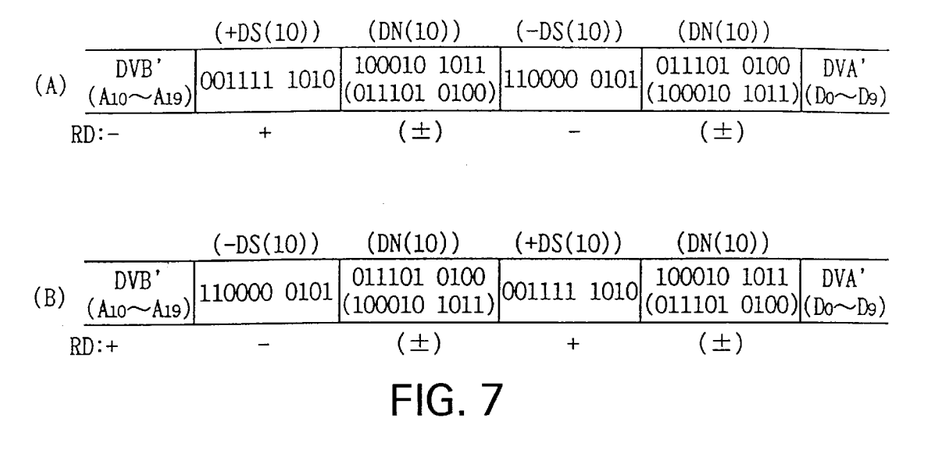
FIG. 7 is a schematic diagram illustrating the operation of the P/S conversion unit in the example shown in FIG. 1.

Two 10-bit word synchronous data DS(10) and the 10-bit neutral auxiliary word data DN (10) ranging alternately in succession will be placed between word data ($A_{10}$–$A_{19}$) in the 10-bit word string data DVB' that can be obtained by giving the 8–10 bit conversion to the 8-bit word string data DVB and word data ($D_0$–$D_9$) in the 10-bit word string data DVA' that can be obtained by giving the 8–10 bit conversion to the 8-bit word string data DVA. The processing of assigning two 10-bit word synchronous data DS (10) and the 10-bit neutral auxiliary word data DN (10) alternately between the word data ($A_{10}$–$A_{19}$) and the word data ($D_0 D_9$) in the part corresponding to the horizontal blanking interval in each horizontal interval part of the composite 10-bit word serial data DZ alternately will be conducted as follows:

Firstly, the first one in the 10-bit word synchronous data having plus RD +DS (10) allocated to the part corresponding to the horizontal blanking interval in each horizontal part of 10-bit word string data DZA, i.e., "001111 1010" and the 10-bit word synchronous data having minus RD −DS (10), i.e., "001111 0101" will be selected. As shown in FIG. 7 (A), in the case where the first one is the 10-bit word synchronous data +DS (10) having plus RD and follows the word data ($A_{10}$–$A_{19}$) having minus RD, i.e., "001111 1010", then next, the 10-bit neutral auxiliary word data DN (10) inserted to the part corresponding to the horizontal blanking interval in each horizontal part of the 10-bit word string data DZB, i.e., "100010 1011 " or "011101 0100", will be selected. Then, the 10-bit word synchronous data having minus RD −DS (10) inserted to the part corresponding to the horizontal blanking interval in each horizontal interval part of the 10-bit word string data DZA, i.e., "110000 0101" will be selected, and further the 10-bit neutral auxiliary word data DN (10) inserted to the part corresponding to the horizontal blanking inteval in each horizontal interval part of the 10-bit word string data DZB, i.e., "011101 0100" or "110000 0101" will be selected.

In this case, the 10-bit word synchronous data having plus RD +DS (10), i.e., "001111 1010", the 10-bit neutral auxiliary word data DN (10) "100010 1011" or "011101 0100", the 10-bit word synchronous data having minus RD −DS (10), i.e., "110000 0101", and the 10-bit neutral auxiliary word data DN (10) "011101 0100" or "100010 1011" will be placed in succession on the part corresponding to the horizontal blanking interval in each horizontal part of the composite 10-bit word string data DZ that is serial data.

On the other hand, as shown in FIG. 7 (B), at the time when the first one selected from the 10-bit word synchronous data having plus RD +DS (10), i.e., "001111 1010" and the 10-bit word synchronous data having minus RD −DS (10), i.e., "110000 0101", is the one that follows the word data ($A_{10}$–$A_{19}$) having minus RD and is the 10-bit word synchronous data having minus RD −DS (10), i.e., "110000 0101", the 10-bit neutral auxiliary word data DN (10) inserted to the part corresponding to the horizontal blanking interval in each horizontal interval part of the 10-bit word string data DZB, "011101 0100" or "100010 1011" will be selected next. Then, the 10-bit word synchronous data having plus RD +DS(10) inserted to the part corresponding to the horizontal blanking interval in each horizontal part of the 10-bit word string data DZA, i.e., "001111 1010" will be selected, and furthermore, 10-bit neutral auxiliary word data DN (10) inserted to the part corresponding to the horizontal blanking interval in each horizontal part of the 10-bit word string data DZB, "100010 1011" or "011101 0100" will be selected.

In this case, the 10-bit word synchronous data having minus RD, i.e., "110000 0101", the 10-bit neutral auxiliary word data DN (10) "011101 0100" or "100010 1011", the 10-bit word synchronous data having plus RD +DS (10), i.e., "001111 1010", and the 10-bit neutral auxiliary word data DS (10) "100010 1011" or "011101 0100" will be placed consecutively on the part corresponding to the horizontal blanking interval in each horizontal interval part of the composite 10-bit string data DZ (serial data).

More specifically, the 10-bit word synchronous data having minus RD −DS(10), i.e., "110000 0101" and the 10-bit synchronous data having plus RD +DS (10), i.e., "001111 1010" exist certainly on the part corresponding to the horizontal blanking interval in each horizontal interval part of the composite 10-bit word string data DZ that is serial data attended by 10-bit neutral auxiliary data DN (10) respectively.

In this connection, either "100010 1011" or "11011101 0100" may be assigned to the 10-bit neutral auxiliary data DN (10) and it continues from plus or minus of the immediately preceding RD.

With the above arrangement, the composite 10-bit word string data DZ obtained from the P/S conversion unit 22 in the 10-bit word string data forming unit 20 is supplied to the optical transmission unit 25 forming the data output unit. The optical transmission unit 25 converts the composite 10-bit word string data DZ to optical signal LZ, and transmits that optical signal LZ to a data transmission path 26 formed by using such as optical fiber. Thus, the composite 10-bit word string data DZ will be transmitted.

Figure 8:
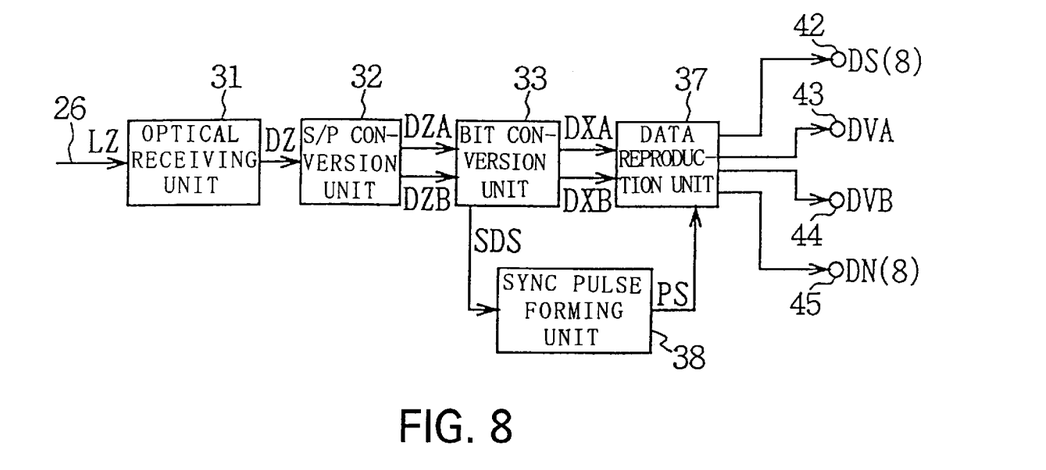
FIG. 8 is a block diagram showing an example of the data receiving device that receives the data transmitted from the data transmission device according to the present invention.

FIG. 8 shows an example of the data receiving device which receives the composite 10-bit word string data DZ transmitted. The data receiving device shown in this FIG. 8, is equipped with an optical receiving unit 31 which detects the optical signal LZ upon receiving this optical signal LZ coming in through the data transmission path 26 formed by using optical fiber.

The optical receiving unit 31 reproduces serial data, that is electric signal, from the optical signal LZ detected. Then, the serial data composite 10-bit word string data DZ to be obtained from the optical receiving unit 31 will be supplied to the serial/parallel (S/P) conversion unit 32.

Figure 9:
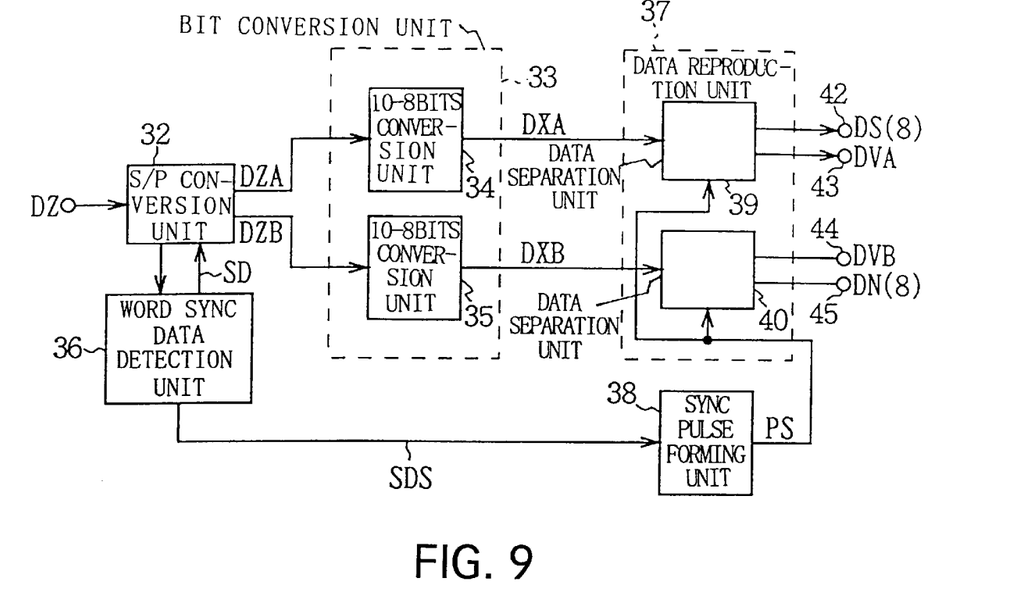
FIG. 9 is a block diagram showing the detailed construction of the part including the bit conversion unit and the data reproduction unit according to the example shown in FIG. 8.

At this point, FIG. 9 shows the detailed construction of the receiving end shown in FIG. 8, and the S/P conversion unit 32 transmits the 10-bit word string data DZ received via said optical receiving unit 31 to the word synchronous data detection unit 36. The word synchronous data detection unit 36 detects the word synchronous data +DS (10) "001111 1010" assigned at the transmitting end from the 10-bit word string data DZ. In this case, the word synchronous data detection unit 36 is adopted to conduct 20 bits synchronous detection based on the fiber channel standard and it detects "001111 1010" as the 10-bit word synchronous data having the plus RD countering in serial data DZ, and "011101 0100" or "100010 1011" as the 10-bit neutral auxiliary word data DN (10) following said word synchronous data +DS (10).

As shown in FIGS. 6 and 7, word string data to be assigned is arranged in the order of −DS (10) and +DS (10), or +DS (10) and −DS (10) depending upon plus or minus of the RD of the immediately preceding word data of the area replaced by the word synchronous data. Accordingly, in the serial data DZ which is formed by multiplexing the word synchronous data and neutral auxiliary word data DN (10), +DS (10) and −DS (10) certainly exist having the 10-bit neutral auxiliary word data DN (10) between.

Accordingly, if 20-bit synchronous detection is conducted in the word synchronous data detection unit 36, 20-bit data formed in combination of word synchronous data +DS (10) and neutral auxiliary data DN (10) can be certainly detected. The word synchronous data detection unit 36 thus detected the word synchronous data +DS (10) cuts out the serial data DZ per 10 bits by the dividing timing signal SD obtained based on the word synchronous data +DS (10), and simultaneously, distributes said cut out 10-bit data between the first channel and the second channel alternately.

The 10-bit word string data DZA put in the first channel and the 10-bit word string data DZB put in the second channel will be supplied to the bit conversion unit 33 (FIG. 9). The bit conversion unit 33 is comprised of a 10–8 bit conversion unit 34 and a 10–8 bit conversion unit 35 for example. The 10-bit word string data DZA to be obtained from the S/P conversion unit 32 and word clock will be supplied to the 10–8 bit conversion unit 34, and the 10-bit word string data DZB to be obtained from the S/P conversion unit 32 and the word clock will be supplied to the 10–8-bit conversion unit 25.

In the 10–8 bits conversion unit 34, 10–8 bits conversion is applied to the 10-bit word string data DZA, and the 10-bit word string data DZA is converted to the 8-bit word string data DXA. Moreover, in the 10–8 bits conversion unit 35, 10–8 bits conversion is applied to the 10-bit word string data DZB and 10-bit word string data DZB is converted to the 8 bit word string data DXB.

The 8-bit word string data DXA obtained from the 10–8 bits conversion unit 34 in the bit conversion unit 33 and the 8-bit word string data DXB formed in the 10–8 bits conversion unit 35 of the bit conversion unit 33 are supplied to data reproduction unit 37. And the word synchronous detection output signal DS obtained from the word synchronous data detection unit 36 is supplied to the synchronizing pulse forming unit 38. In the synchronous pulse forming unit 38, horizontal synchronizing pulse signal PS synchronized with the detection output signal SDS obtained when the 10-bit word synchronous data +DS (10) having plus RD, i.e., "001111 1010", is detected per the part corresponding to the horizontal blanking interval in the horizontal interval part of the word synchronous data detection unit 36 is formed. Then, the horizontal synchronizing pulse signal PS obtained from the synchronizing pulse forming unit 38 will be supplied to the data reproduction unit 37.

The data reproduction unit 37 is comprised of such as a data separation unit 39 and a data separation unit 40 as shown in FIG. 9. The 8-bit word string data DXA obtained from the 10–8 bits conversion unit 34 of the bit conversion unit 33 and the horizontal synchronizing pulse signal PS obtained from the synchronizing pulse forming unit 38 will be supplied into the data separation unit 39 and furthermore, the 8-bit word string data DXB obtained from the 10–8 bits conversion unit 35 in the bit conversion unit 33 and the horizontal synchronizing pulse signal PS obtained from the synchronizing pulse forming unit 38 will be supplied into the data separation unit 40.

In the data separation unit 39, as well as EAV (end of active video) based on the horizontal synchronizing pulse signal PS is added to the 8-bit word string data DXA in which 2word synchronous data DS (8) are applied to the part corresponding to the horizontal blanking interval in each horizontal interval part, data separation is provided under the horizontally synchronized condition, 8-bit word string data DVA showing image signal information and 8-bit word synchronous data DS (8) are separated from the 8-bit word string data DXA and these DVA and DS (8) are transmitted to data terminals 42 and 43 respectively.

Furthermore, in the data separation unit 40, as well as EVA and SAV based on the horizontal synchronizing pulse signal PS are added to the 8-bit word string data DXB in which 2 auxiliary word data DN (8) are applied to the part corresponding to the horizontal blanking interval in each horizontal interval part, data separation is applied under the horizontally synchronized condition, 8-bit word string data DVB showing image signal information and 8-bit auxiliary word data DN (8) are separated from the 8-bit word string data DXB and these are transmitted to data terminals 44 and 45 respectively.

In the example of receiving device shown in FIG. 8 and FIG. 9, the word synchronous data detection to the 10-bit word string data DZA that is obtained from the composite 10-bit word string data DZ received will be executed by only detecting the 10-bit word synchronous data +DS (10) having plus RD, i.e., "001111 1010" and not detecting the 10-bit word synchronous data −DS (10) having minus RD, i.e., "001111 0101". Even under such condition, since the received composite 10-bit word string data (serial data) DZ is arranged in the order that the 10-bit word synchronous data +DS (10) having plus RD, i.e., "001111 1010" is succeeded by "110000 0101", or the 10-bit word synchronous data −DS (10) having minus RD, i.e., "110000 0101" is succeeded by "001111 1010", and these to are replaced having neutral auxiliary word data DN (10) between respectively, word synchronous data detection at each part corresponding to the horizontal blanking interval in each horizontal interval part of 2 channels of image signal information r multiplexed to the composite 10-bit word string data (serial data) DZ can be certainly conducted, and as a result, in 2 channels of 10-bit word string data separated from the composite 10-bit word string data (10) DZ, i.e., DZA and DZB, the word synchronization can be certainly conducted at each horizontal interval.

Since in the receiving device, even though the word synchronous data detection to the 10-bit word string data DZA obtained from the composite 10-bit word string data DZ detects only the 10-bit word synchronous data −DS (10) having minus RD, i.e., "110000 0101" and not detect the 10-bit word synchronous data +DS (10) having plus RD, i.e., "001111 1010", the received composite 10-bit word string data DZ is inserted in the order that the 10-bit word synchronous data +DS (10) having plus RD, i.e., "1001111 1010" and the 10-bit word synchronous data −DS (10) having minus RD, i.e., "110000 0101" are so arranged that "001111 1010" is succeeded by "110000 0101" or "110000 0101" is succeeded by "001111 1010" at the part corresponding to the horizontal blanking interval in each horizontal interval part, the word synchronous data detection in every part corresponding to the horizontal blanking interval in each horizontal part of the composite 10-bit word string data (serial data) DZ can be certainly conducted and as a result, it is assumed that the word synchronization has been certainly conducted on 2 cannels of 10-bit word string data DZA and DZB separated from the composite 10-bit word string data (serial data) DZ at horizontal intervals.

In said example shown in FIGS. 1, 2, and 3, the composite 10-bit word string data DZ obtained from the 10-bit word string data forming unit 20 is converted to optical signal LZ by the optical transmission unit 25 and to be transmitted through the data transmission path 26 formed by using optical fiber. However, in the data transmission device according to this invention, the composite 10-bit word string data equal to the composite 10-bit word string data DZ may be transmitted directly, such as via the data transmission path formed by a coaxial cable, or via wireless transmission.

Furthermore, the embodiment described above in FIGS. 1, 2 and 3 has dealt with the case of transmitting 2 channels of image signal information. However, the present invention can be applied to the case of transmitting one channel or more than three (3) channels, provided that the word synchronous data +DS (10) and −DS (10) and the neutral auxiliary word data DN (10) are arranged on a part of transmission data, and furthermore, the signal to be transmitted is not only limited to image signal, but also the present invention can be applied to the case when transmitting other various data.

Industrial Applicability

The present invention can be utilized in the case where the word synchronization is conducted at horizontal intervals at the receiving end when transmitting image signal.

What is claimed is:

1. A data transmission method, comprising the steps of:

obtaining 8-bit word string data showing signal information, assigning two 8-bit word synchronous data having preset codes between words of said 8-bit word string data corresponding to a predetermined timing signal and after bit converting said two 8-bit word synchronous data to 10-bit word string data, a composite 10-bit word string data having a part in which two consecutive 10-bit word synchronous data are inserted is obtained and said composite 10-bit word string data is put out for transmission; and when bit converting said 8-bit word synchronous data, if the immediately preceding word data is word data having a plus running disparity, said 8-bit word synchronous data is converted to 10-bit word synchronous data having a minus running disparity, and if the immediately preceding word data is word data having a minus running disparity, said 8-bit word synchronous data is converted to 10-bit word synchronous data having a plus nruning disparity.

2. The data transmission method according to claim 1, wherein:

the 8-bit word string data shows image signal information, and the predetermined timing signal concerned in the assigning of 8-bit word synchronous data to said 8-bit word string data is in synchronism with each horizontal interval in said image signal information.

3. The data transmission method according to claims 1 or 2, wherein:

the composite 10-bit word string data will be transmitted via a data transmission path formed by using optical fiber.

4. A data transmission method, comprising the steps of:

obtaining first and second 8-bit word string data, each representing signal information, assigning two 8-bit word synchronous data having present codes between words in said first 8-bit word string data corresponding to a predetermined timing signal, successively assigning two 8-bit words which are to be converted to 10-bit neutral word data between words in said 8-bit word string data, bit converting the first 8-bit word string data in which said 8-bit word synchronous data is inserted to a first 10-bit word string data, bit converting said second 8-bit word string data in which said 8-bit auxiliary word data is inserted to a second 10-bit word string data, and after converting said first and second 10-bit word data to serial data, said serial data will be transmitted; and when converting said first 8-bit word string data to the first 10-bit word string data, if the immediately preceding word data is word data having a plus running disparity, said 8-bit word synchronous data is converted to 10-bit word synchronous data having a minus running disparity and if the immediately preceding word data is word data having a minus running disparity, said 8-bit word synchronous data is converted to 10-bit word synchronous data having a plus running disparity and when converting said first and second 10-bit word data to serial data, the two 10-bit word synchronous data based on said 8-bit word synchronous data and 10-bit neutral word data based on said 8-bit auxiliary word data will be formed alternately in succession in said serial data.

5. The data transmission method according to claim 4, wherein:

the first and second 8-bit word string data show image signal information respectively, and the timing signal concerned in the insertion of two 8-bit word synchronous data to the first 8-bit word string data and the insertion of two 8-bit auxiliary word data to said second 8-bit word string data is in synchronism with each horizontal interval in said image signal information.

6. The data transmission method according to claims 4 or 5, wherein:

the serial data will be transmitted via a data transmission path formed by using optical fiber.

7. A data transmission device comprising:

a digital data forming unit for obtaining 8-bit word string data showing signal information;

a word synchronous data generation unit for outputting 8-bit word synchronous data of a preset code;

a data adder unit for allocating two (2) of said 8-bit word synchronous data between words in said 8-bit word string data corresponding to a predetermined timing signal;

a 10-bit word string data forming unit for converting the 8-bit word string data to which the 8-bit word synchronous data obtained from said data adder unit is allocated to 10-bit word string data and for obtaining a composite 10-bit word string data having a part to which two 10-bit word synchronous data based on said 8-bit word synchronous data are allocated in succession; and data output unit for outputting in order to transmit said composite 10-bit word string data; and wherein:

when bit converting using said 10-bit word string data forming unit, when the immediately preceding word data is word data having a plus running disparity, said 8-bit word synchronous data is converted to 10-bit word synchronous data having a minus running disparity, and when the immediately preceding word data is word data having a minus running disparity, said 8-bit word synchronous data is converted to 10-bit word synchronous data having a plus running disparity.

8. The data transmission device according to claim 7, wherein:

the digital data forming unit is to obtain 8-bit word string data showing image signal information, and the data adder unit uses the signal synchronized with each horizontal interval in the image signal information as the timing signal concerned in allocating the 8-bit word synchronous data to 8-bit word string data showing said image signal information.

9. The data transmission device according to claim 7 or 8, wherein:

the data output unit is comprised of an optical transmission unit for outputting the composite 10-bit word string data as an optical signal to a data transmission path formed by using optical fiber.

10. A data transmission device comprising:

a plurality of digital data forming units for obtaining 8-bit word string data showing signal information;

a word synchronous data generating unit for outputting 8-bit word synchronous data having a preset code;

an auxiliary word data generation unit for outputting 8-bit auxiliary word data which will be bit converted to 10-bit neutral word data;

a plurality of data adder units for assigning two of said 8-bit word synchronous data successively between words in said 8-bit word string data corresponding to a predetermined timing signal;

a plurality of bit conversion units for bit converting the 8-bit word string data, in which said 8-bit word synchronous data obtained from the plurality of data adder units is inserted, to 10-bit word string data;

a parallel/serial conversion unit for converting said 10-bit word string data to serial data; and a data output unit for outputting said serial data for transmission; and wherein:

when said plurality of bit conversion units convert said 8-bit word string data to said 10-bit word string data, if the immediately preceding word data is word data having a plus running disparity, said 8-bit word synchronous data will be converted to 10-bit word synchronous data having a minus running disparity, and if the immediately preceding word data is word data having a minus running disparity, the 8-bit word synchronous data will be converted to 10-bit word synchronous data having a plus running disparity and when the parallel/serial conversion unit converts said 10-bit word string data to serial data, said serial data contains a part in which two 10-bit word synchronous data based on the 8-bit word synchronous data and 10-bit neutral word data based on the 8-bit auxiliary word data are alternately in succession.

11. The data transmission device according to claim 10, wherein:

the plurality of digital data forming units obtain 8-bit word string data showing the image signal information, and the plurality of data adder units use a signal synchronized with a horizontal interval in the image signal information as the predetermined timing signal concerned in the assignment of two 8-bit word synchronous data to the 8-bit word string data showing image signal information.

12. The data transmission device according to claim 10 or 11, wherein:

the data output unit is comprised of an optical transmission unit to output serial data as an optical signal to a data transmission path formed by using optical fiber.

* * * * *